(12) United States Patent
Pan et al.

(10) Patent No.: US 6,889,045 B2
(45) Date of Patent: May 3, 2005

(54) METHOD AND APPARATUS FOR IMPLEMENTING BI-DIRECTIONAL SOFT HANDOVERS BETWEEN WIRELESS NETWORKS VIA MEDIA GATEWAY CONTROL

(75) Inventors: Shaowei Pan, Kildeer, IL (US); Jinzhong Zhang, Barrington, IL (US); Angel Favila, Lake in the Hills, IL (US); Nicholas Labun, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 14 days.

(21) Appl. No.: 10/180,414

(22) Filed: Jun. 26, 2002

(65) Prior Publication Data

US 2004/0192294 A1 Sep. 30, 2004

(51) Int. Cl.[7] .............................. H04Q 7/20; H04Q 7/00
(52) U.S. Cl. ........................ 455/436; 455/439; 370/331
(58) Field of Search ................................. 455/442, 436, 455/437, 422.1, 439, 417, 445, 552.1, 553.1, 416

(56) References Cited

U.S. PATENT DOCUMENTS

| | | | |
|---|---|---|---|
| 5,548,636 A | | 8/1996 | Bannister et al. |
| 5,668,862 A | | 9/1997 | Bannister et al. |
| 5,737,703 A | * | 4/1998 | Byrne .......................... 455/442 |
| 5,850,606 A | * | 12/1998 | Bedingfield et al. ......... 455/439 |
| 5,862,208 A | | 1/1999 | McLampy et al. |
| 6,330,448 B1 | | 12/2001 | Otsuka et al. |
| 6,501,952 B1 | * | 12/2002 | Foster et al. ................. 455/436 |
| 2002/0198020 A1 | | 12/2002 | Mooney |
| 2003/0003915 A1 | * | 1/2003 | Foster et al. ................. 455/442 |
| 2003/0003916 A1 | * | 1/2003 | Foster et al. ................. 455/442 |

FOREIGN PATENT DOCUMENTS

| | | |
|---|---|---|
| EP | 0 711 485 B1 | 4/1997 |
| WO | WO 00/28752 | 5/2000 |

* cited by examiner

*Primary Examiner*—David Hudspeth
*Assistant Examiner*—S. Smith
(74) *Attorney, Agent, or Firm*—Hisashi D. Watanabe

(57) ABSTRACT

The present invention provides a method and apparatus that enables handover of a mobile station between a cellular network and a wireless network without control intervention from the cellular network and independent of employed air interface technology. The signaling and control of a switch, for example SS7 messaging, is not required to achieve the handovers implemented by the present invention. In particular, a call is connected (504) between a mobile station (202) and a remote station (204) through a media gateway (210). The media gateway is connected to the mobile station via a first connection line and to the remote station via a second connection line. Next, a communication directed to a predetermined number by the mobile station is received (520) or, in the alternative, a connection signal that includes a call header is sent to the mobile station. A third connection line between the media gateway and the mobile station is then established (524). Thereafter, communication between the media gateway and the mobile station is handed-over (526, 528) from the first connection line to the third connection line.

16 Claims, 7 Drawing Sheets

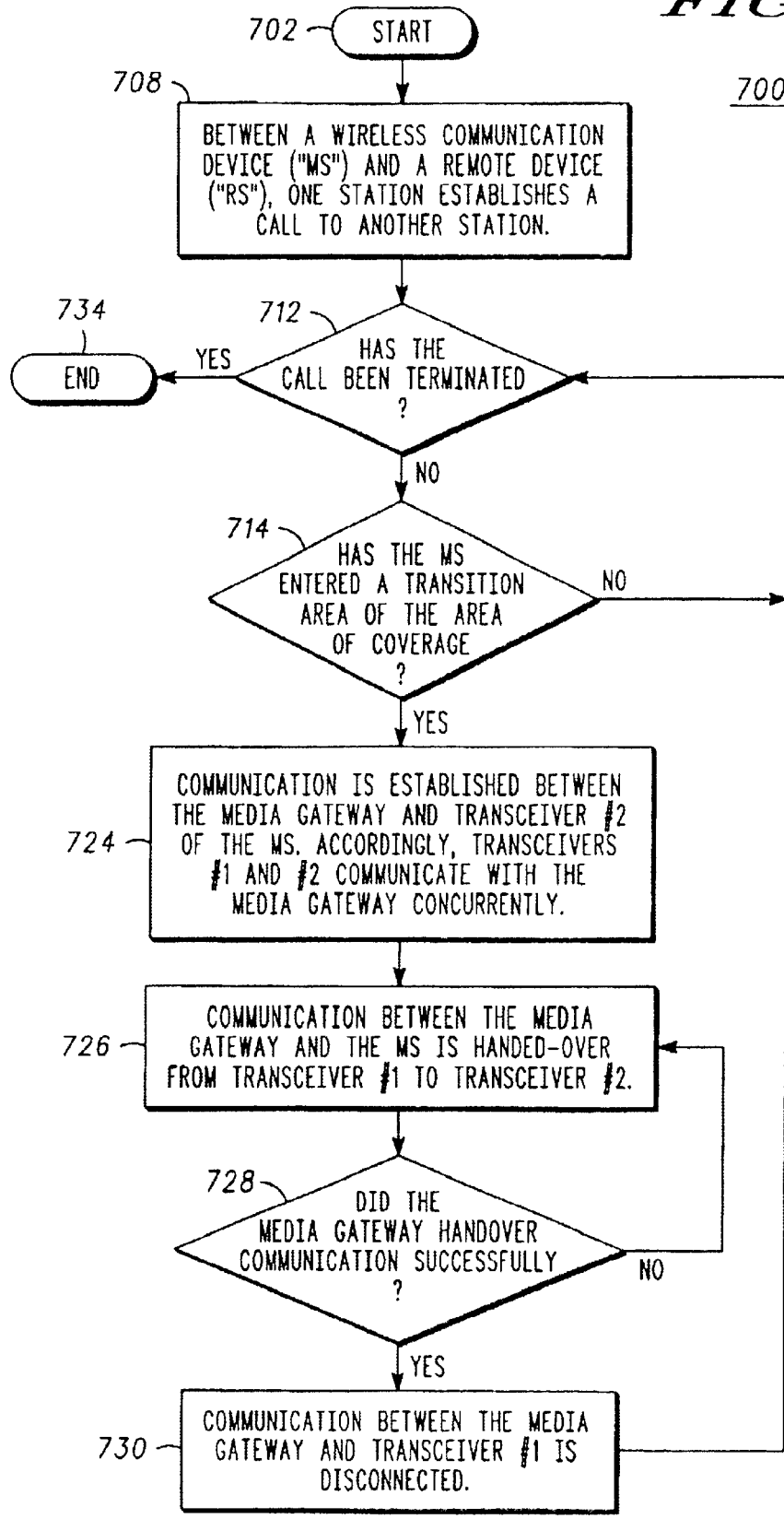

METHOD AND APPARATUS FOR IMPLEMENTING BI-DIRECTIONAL SOFT HANDOVERS BETWEEN WIRELESS NETWORKS VIA MEDIA GATEWAY CONTROL

FIELD OF THE INVENTION

The present invention relates generally to a mobile communication system, and more particularly, to an apparatus and method for implementing bi-directional handovers between a cellular network and another wireless network without cellular network control intervention.

BACKGROUND OF THE INVENTION

Handover procedures are well known in the art of cellular telephony. A mobile subscriber unit, i.e., a mobile station, typically connects to a cellular network by detecting some form of beacon signal transmitted by a Base Transceiver Station ("BTS") and then synchronizing itself to that BTS. During a call, the mobile station and/or the network monitor criteria such as the Radio Signal Strength Indication ("RSSI") at either the mobile station and/or a base station and decide when the mobile station should handover to another BTS. More sophisticated criteria related to voice quality are also often utilized for making handover decisions, for example Bit Error Rate ("BER") or Frame Erasure Rate ("FER").

Wireless networks that utilize cellular air interface technology and enable handover of a mobile station from a cellular network Mobile Switching Center ("MSC") to a Private Branch Exchange ("PBX") coverage area are known. Networks of this type can be employed as enterprise networks providing businesses with "on campus" coverage. For example, a Global System For Mobil Communications ("GSM") mobile subscriber using a GSM cellular network, who is also an enterprise subscriber, may handover to an enterprise GSM network upon moving into a radio coverage area of the enterprise campus. The local PBX functionality is utilized for switching calls internal to the PBX network, or to a Public Switched Telephone Network ("PSTN") for external calls, thus saving the enterprise the cost imposed by the external cellular network switching as known in the art.

Handover of a mobile station between a cellular network and an enterprise network incorporating the same radio interface technology is, in general, accomplished by coordinating the communication and control links with the mobile station, the cellular network, and the enterprise network. These known handover methods require the wireless network to employ the same radio interface technology as the cellular network, and also require the MSC and PBX to communicate, for example via SS7 messaging. Therefore, an enterprise user must subscribe to a particular cellular provider in order to use the same mobile station on both networks.

Existing enterprise networks need to coordinate with a cellular network, using a protocol such as SS7 messaging, in order to handover a mobile station between the enterprise and cellular networks. These requirements for coordinating with a cellular network place a significant burden upon the operator of an enterprise network. First, the air interface technology of the cellular operator limits the choice of mobile stations that the enterprise operator can utilize within the enterprise. Additionally, the coordination required between the two networks limits the enterprise to cellular operators that provide on-campus solutions with their respective service offerings.

There would be benefits to enterprise network operators and users if mobile stations could operate, in a seamless manner, between cellular and wireless networks independent from the cellular air interface and control coordination technology. An enterprise will benefit in higher productivity and cost savings where its users operate a single mobile station both on and off the enterprise campus. An individual user would benefit from a single personal device that could be used for multiple purposes, for example work related and personal communications. Enterprise users will also, in general, not employ the same cellular operators as each individual enterprise user employs for personal use. Businesses are generally constrained to select providers based upon cost. Other considerations such as feature availability and interoperability between the enterprise and external networks is also a consideration for businesses. The best of both worlds is difficult to achieve in these respects.

In addition, other modes of service enhancements, or service enhancement businesses could exist if there were a means of utilizing wireless networks independently from the cellular technology employed by the mobile station. It is the aspect of handover control by the cellular network that is a limiting factor in achieving such seamless mobility of a mobile station.

Therefore, a need exists for an apparatus and method for implementing bi-directional soft handovers between a cellular network and a wireless network without cellular network control intervention.

SUMMARY OF THE INVENTION

To address the above-mentioned need, a method and apparatus for implementing bi-directional soft handovers between a cellular network and a wireless network without cellular network control intervention is provided herein.

The present invention is a method for managing a communication network having an area of coverage in which the communication network is associated with a media gateway that communicates with a plurality of mobile stations. A call is connected between a mobile station and a remote station through the media gateway. The media gateway is connected to the mobile station via a first connection line and to the remote station via a second connection line. The media gateway or the mobile station then determines whether the mobile station entered a transition area of the area of coverage. Next, a communication directed to a predetermined number by the mobile station is received to establish a third connection line to the media gateway. The media gateway or the mobile station then established the third communication line between the media gateway and the mobile station. In the alternative, a connection signal is sent to the mobile station to establish a third connection line between the media gateway and the mobile station. The connection signal includes a call header to inform the mobile station that handover from the first connection line to the third connection line will occur. Thereafter, communication between the media gateway and the mobile station is handed-over from the first connection line to the third connection line.

The present invention is also a wireless communication system comprising a mobile station, a carrier network, a non-carrier network and a media gateway associated with the non-carrier network. The mobile station is capable of communication with a remote station. The carrier network enables wireless communication between the mobile station and the remote station within a carrier area of coverage. The non-carrier network enables wireless communication between the mobile station and the remote station within a non-carrier area of coverage. The media gateway connects a call between the mobile station and the remote station. In addition, the media gateway is capable of connecting a first connection line with the mobile station via the carrier network or the non-carrier network; receiving a communication directed to a predetermined number by the mobile station to establish a second connection line to the media gateway; and establishing the second connection line with the mobile station via the carrier network or the non-carrier network, whichever network is not used for the first connection line, after receiving the communication by the mobile station to the predetermined number.

BRIEF DESCRIPTION OF THE DRAWINGS

FIG. 7 is a flow diagram illustrating a preferred operation of the mobile station of FIG. 6.

DETAILED DESCRIPTION OF THE PREFERRED EMBODIMENTS

The present invention relates to a method and apparatus for implementing bi-directional soft handovers of a mobile station between two networks without network control intervention between the networks. In particular, the present invention enables a mobile station to operate seamlessly from one wireless network and another wireless network without regard to the air interface technology utilized by the mobile station for wireless communications.

The present invention is utilized for situations in which a mobile station moves between control areas of various networks, such as carrier networks and non-carrier networks. Carrier networks operate on cellular networks and, generally, are controlled by cellular carriers including, but not limited to, AT&T Wireless of Redmond, Washington; Cingular Wireless of Atlanta, Ga.; Sprint PCS of Overland Park, Kans.; Verizon Wireless of New York, N.Y.; and VoiceStream Wireless of Bellevue, Wash. Carrier networks typically employ an analog-based air interface and/or one or more digital-based air interfaces. Digital-based air interfaces utilize digital communication technologies including, but not limited to, Code Division Multiple Access (CDMA), Time Division Multiple Access (TDMA), Global System For Mobile Communications (GSM), Wideband Code Division Multiple Access (WCDMA), Code Division Multiple Access-3rd Generation (CDMA2000), and the like. Non-carrier networks operate on wireless networks and, generally, are not controlled by cellular carriers. Non-carrier networks employ a wireless local area network (WLAN) based air interface including, but not limited to, IEEE 802.11™ supported by the Institute of Electrical and Electronics Engineers, Inc. (such as Wi-Fi supported by the Wireless Ethernet Compatibility Alliance), Bluetooth™ supported by the Bluetooth SIG, Inc., HomeRF supported by the HomeRF Working Group Inc., and the like.

Figure 1:
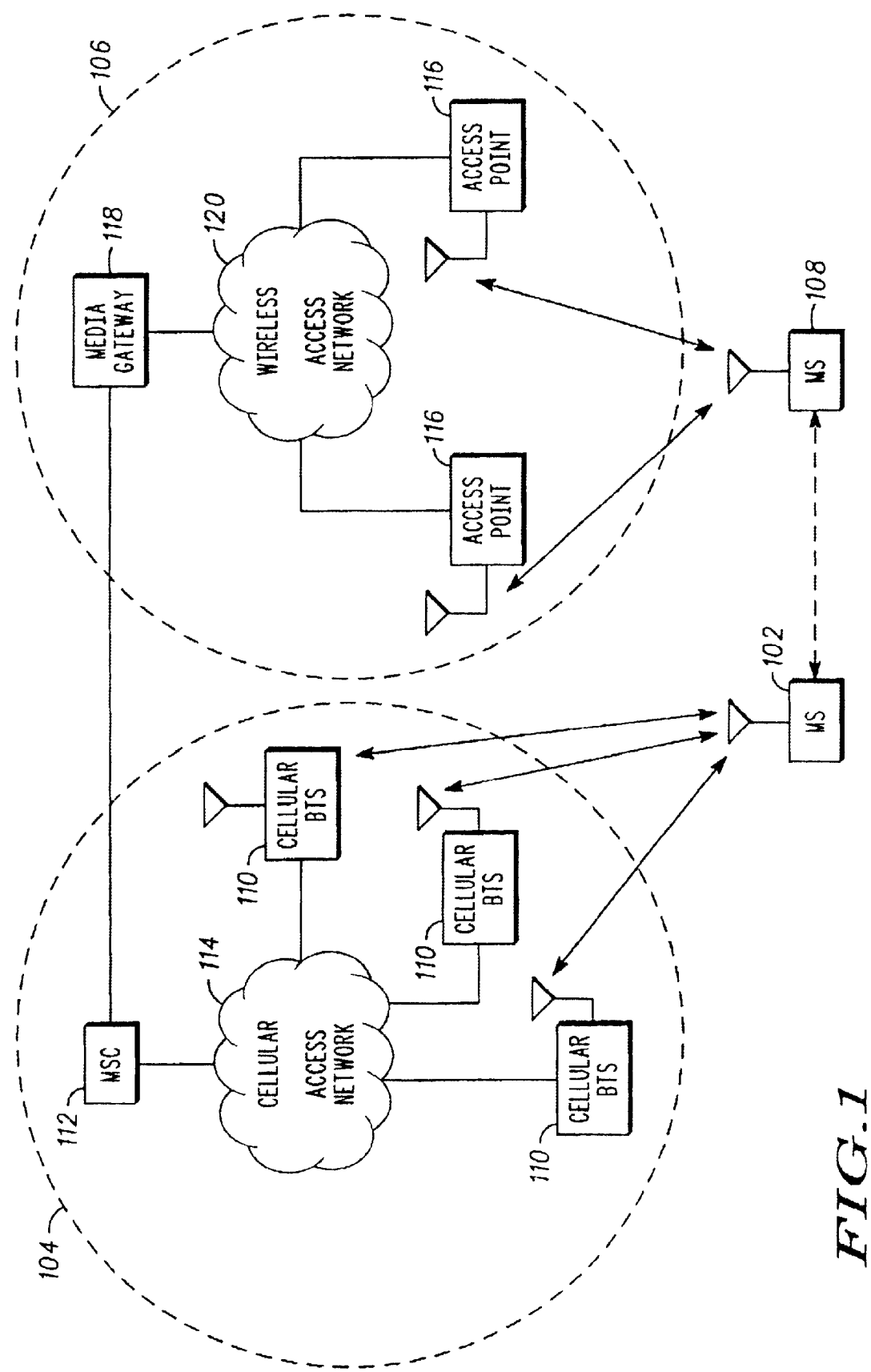
FIG. 1 is a block diagram illustrating call establishment in accordance with the present invention.

Turning now to the drawings where like numerals designate like components, FIG. 1 is a diagram that illustrates call establishment and handover in accordance with the present invention. For this illustration, a mobile station at a first position 102 may establish a call using a carrier network 104 and, thereafter, handover the call to a non-carrier network 106 after the mobile station moves to a second position 108 within radio coverage (not shown) of the non-carrier network. Likewise, the mobile station at the second position 108 may establish a call using the non-carrier network 106 and, thereafter, handover the call to the carrier network 104 after the mobile station moves to the first position 102 within radio coverage (not shown) of the carrier network 104. Of course, although a carrier network and a non-carrier network are represented in FIG. 1, the present invention may also be utilized for communication between carrier networks and between non-carrier networks.

Referring to the illustration of FIG. 1, each network includes a plurality of transceivers for communicating with the mobile station, an intercommunication component for communicating between networks, and an interoperable arrangement for communicating between the plurality of transceivers and the intercommunication component. As shown by the illustration in FIG. 1, the carrier network 104 may include a plurality of base stations 110, a Mobile Switching Center ("MSC") 112, and a cellular access network 114 communicating between the base stations and the MSC; and the non-carrier network 106 may include a plurality of access points 116, a media gateway 118, and a wireless access network 120 communicating between the access points and the media gateway. The networks 104, 106 communicate with each other via MSC 112 and media gateway 118.

As stated above, the present invention enables a mobile station to operate seamlessly between networks without regard to the air interface technology utilized by the mobile station for wireless communications. It is critical to understanding the present invention to note that a bearer channel established between stations and/or devices is always established through a media gateway, whether the call is initiated from a carrier network to a non-carrier network, from a non-carrier network to a carrier network, from a non-carrier network to another non-carrier network, or from a carrier network to another carrier network. Also, one or more of the stations and/or devices engaged in the call are assigned a telephone number associated with each network, for example, one number for a carrier network and another number for a non-carrier network. For the present invention, mobile stations that are assigned multiple numbers will be capable of handover regardless of the call originator and network of call initiation.

It is also critical to understand that, because all calls are routed through a media gateway, each handover of a mobile station between a networks is a "make before break" soft handover and control of each handover is implemented by a media gateway without intervention or control by a carrier network. Thus, SS7 or other control signaling, as utilized by traditional switching systems, is not required to accomplish the goals of the present invention. For example, in reference to FIG. 1, the present invention does not require SS7 or other control signaling to be communicated between the MSC 112 and the media gateway 118.

Stated another way, the media gateway of the present invention does not handover control of a communication with a mobile station to a carrier network. Instead, the media gateway retains control of the communication as the mobile station re-locates from one network to another network. In particular, when a mobile station and a remote station have a call that is directed through the media gateway, the media gateway has one connection to the mobile station and another connection to the remote station. Herein, the connection between the media gateway and the mobile station shall be referred to as a first call leg. The media gateway then establishes a second call leg with the mobile station so that the first and second call legs exist concurrently, hands over the communication from the first call leg to the second call leg, and disconnects the first call leg after handover has been completed. By retaining control of the communication with the mobile station, the media gateway is capable of handover without intervention or control by a carrier network.

Figure 2:
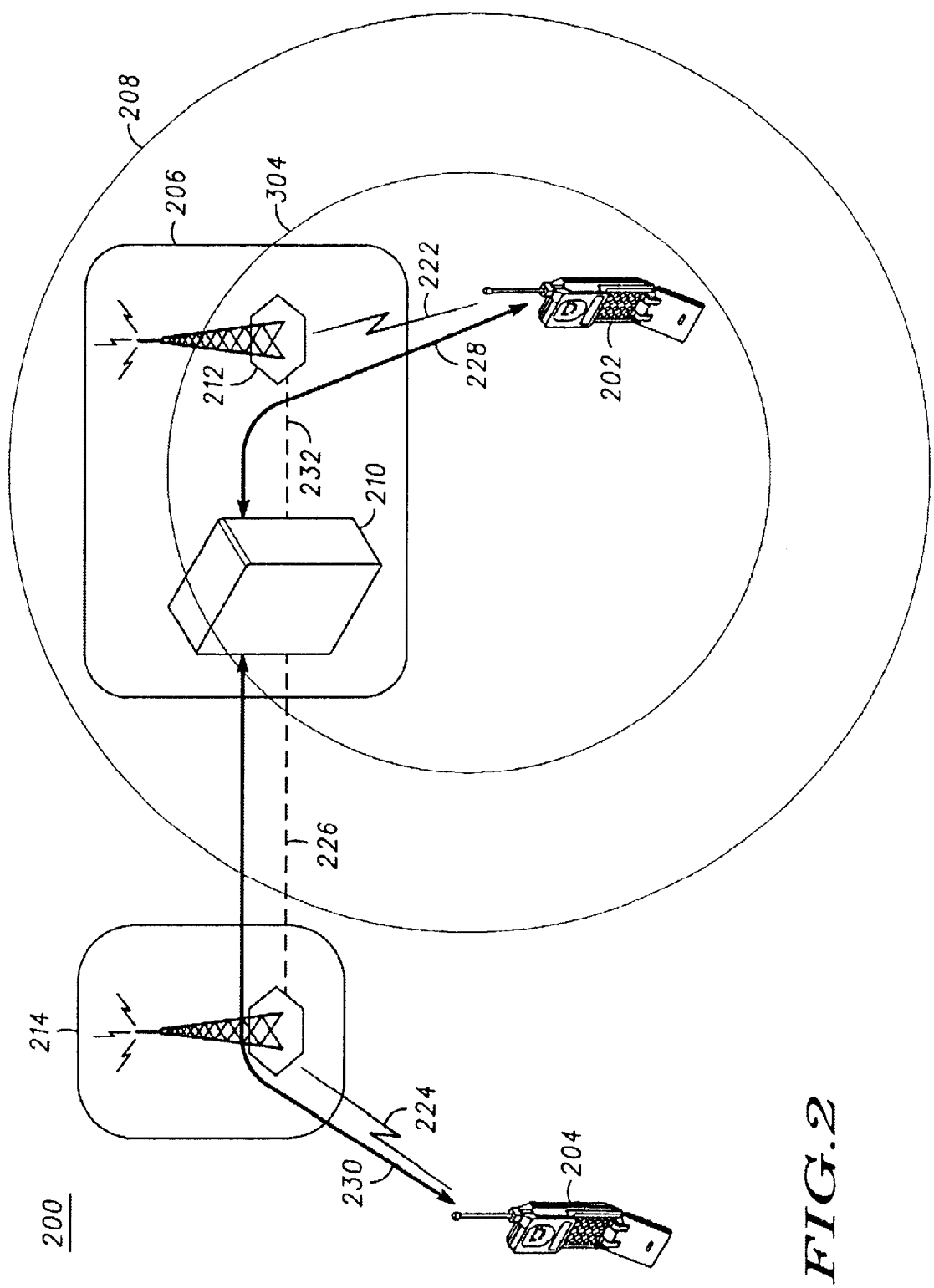
FIG. 2 is a block diagram illustrating a mobile station positioned within a communication network and a media gateway communicating with the mobile station via one communication link in accordance with a preferred embodiment of the present invention.
Figure 3:
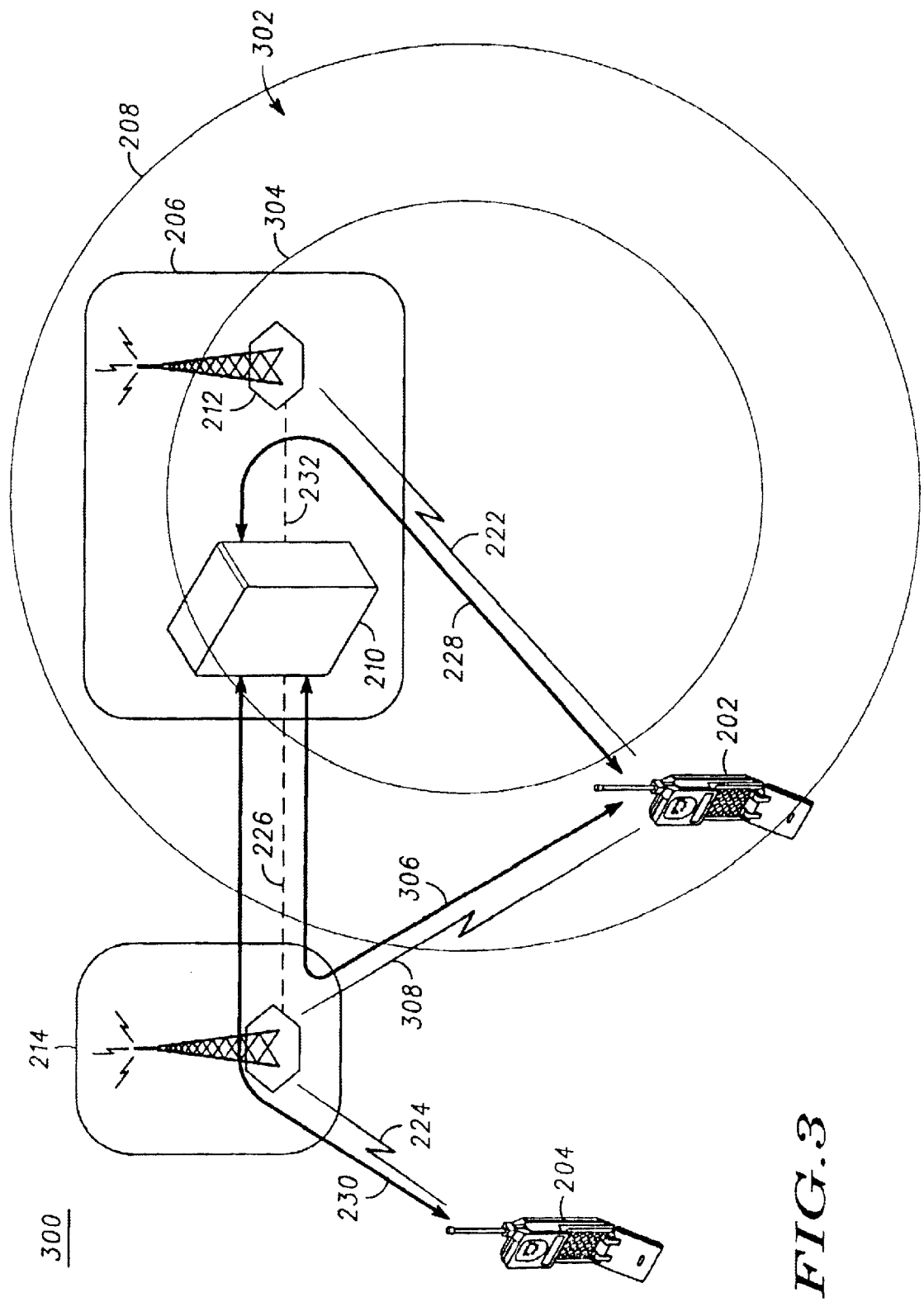
FIG. 3 is a block diagram illustrating the mobile station and media gateway of FIG. 2, in which the mobile station is in transition at a boundary of the communication network and the media gateway is communicating with the mobile station via two communication links.
Figure 4:
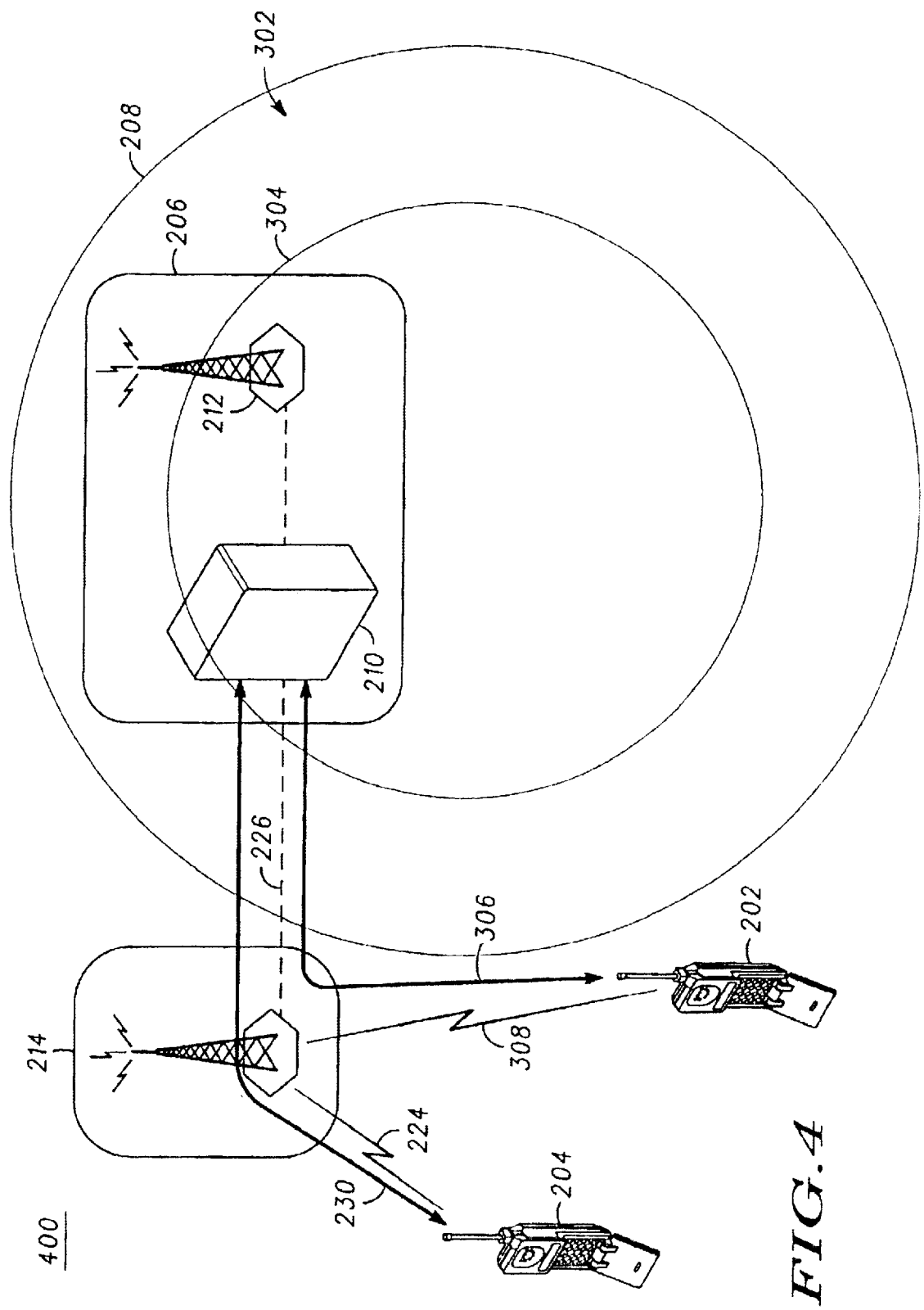
FIG. 4 is a block diagram illustrating the mobile station and media gateway of FIGS. 2 and 3, in which the mobile station is positioned outside of the communication network and the media gateway is communicating with the mobile station via one communication link.

FIGS. 2 through 4 represent a mobile station 202, in communication with a remote station 204, having three different positions relative to a communication network 206. In particular, FIG. 2 illustrates the mobile station 202 positioned within the communication network 206 (or, more particularly, within communication range of the communication network), FIG. 3 illustrates the mobile station 202 in transition at a boundary 208 of the communication network 206, and FIG. 4 illustrates the mobile station 202 positioned outside of the communication network 206 (or, more particularly, outside communication range of the communication network). Although FIGS. 2 through 4 show the remote station 204 outside of the communication range or boundary 208 of the communication network 206, it is to be understood that the location of the remote station is not a limiting factor of the present invention. Accordingly, the remote station 204 may be located within the communication range or boundary 208 of the communication network without significantly changing the functionality of the present invention. The term communication network 206, as used herein, shall refer to the components of the network as well as the area of coverage for the network.

FIGS. 2 through 4 illustrate at least two ways in which the mobile station 202 may transition relative to the communication network 206. In one way, the mobile station may start within the communication network 206 as represented by FIG. 2, transition to the outer boundary 208 of the communication network as represented by FIG. 3, and move beyond the outer boundary as represented by FIG. 4. In another way, the mobile station may start outside of the communication network 206 as represented by FIG. 4, transition to the outer boundary 208 of the communication network as represented by FIG. 3, and move into the communication network as represented by FIG. 4. In either case, the remote device 204 may be within or outside of, the communication network 206. Thus, it is to be understood that the sequential order of the present invention's operation is not necessarily represented by the sequential numbering of the drawings.

Referring to FIGS. 2 through 4, the communication network 206 includes one or more media gateways represented by media gateway 210 and one or more access points represented by access point 212. Although the communication network 206 may be a carrier network or a non-carrier network, for the preferred embodiment, the communication network is a non-carrier network, such as an enterprise network. For example, the communication network 206 may employ a cellular air interface, such as analog, CDMA, TDMA, GSM, WCDMA, and CDMA2000, or may employ a WLAN based air interface, such as IEEE 802.11™, Bluetooth™, and HomeRF.

The media gateway 210 is capable of managing calls between two or more stations regardless of the location of the stations. For example, for the preferred embodiment, the media gateway 210 is coupled to an access point 212 within the communication network's area of coverage, capable of communicating with a station 202 located within the area of coverage, and capable of communicating with a station 204 located outside of the area of coverage. The media gateway 210 is able to communicate with the station 204 outside of the area of coverage by communicating through a second network 214.

The second network 214 includes one or more base stations that provide communication between the media gateway 210 and the remote station 204, and the communication network 206 includes one or more access points 212 that provide communication between the media gateway and the mobile station 202. For example, for the preferred embodiment, the access point 212 has a wireless connection with the mobile station 202, a wired connection with the media gateway 210, and forwards communication from the mobile station to the media gateway, and vice-versa. Although not shown in FIGS. 2 through 4, the second network 214 may include a variety of support components, particularly those components the manage base stations and provide interoperability of base stations to other base stations or networks, such as Mobile Switching Center ("MSC").

Referring to FIG. 2, the mobile station 202 is capable of communicating with the remote station 204 through the communication network 206 and the second network 214, thus forming a bearer channel from the mobile station to the remote station. For the preferred embodiment, the mobile station 202 has a first link 222 to the communication network 206, the remote station 204 has a second link 224 to the second network 214, and the communication and second networks have a wired link 226 there between. Although the second link 224 is shown in FIG. 2 to provide wireless communication for the preferred embodiment, it is to be understood that a wired connection between the remote station 204 and the second network 214 is also suitable for the present invention.

The mobile station 202 communicates with the remote station 204 through the media gateway 210. In particular, the media gateway 210 communicates with the mobile station 202 through a first connection line and communicates with the remote station 204 through a second connection line. For the preferred embodiment, shown in FIG. 2, the second connection line is represented, in part, by the second link 224 and the first connection line is represented, in part, by the first link 222 only if the mobile station 202 is entering the communication network 206. As will be discussed in more detail below, the first link 222 may represent a third connection line if the mobile station 202 is exiting the communication network 206.

The media gateway 210 may be located at any location so long as it is able to communicate with the communication network 206 and the second network 214. For the preferred embodiment, the media gateway 210 is co-located with, and is part of, the communication network 206 and, thus, the media gateway handles address translation and routing within the outer boundary 208 of the communication network. Thus, the media gateway 210 communicates with the mobile station 202 via the first link 222 and communicates with the remote station 204 via the second link 224 and the wired link 226.

Calls between the mobile station 202 and the remote station 204 are routed through the bearer channel to the media gateway 210. Accordingly, the bearer channel includes an inner mobile line 228 extending from the mobile station 202 to the media gateway 210, an outer remote line 230 extending from the media gateway to the remote station 204, and a connection between the inner mobile and outer remote lines through the media gateway 210. For the preferred embodiment, the inner mobile line 228 connects the media gateway 210 and the mobile station 202 via the first wireless connection or link 222, the access point 212, and an intra-network link 232, and the outer remote line 230 connects the media gateway and the remote station 204 via the wired link 226, the second network 214, and the second wireless connection or link 224.

The media gateway 210 may receive a call from one station, i.e., calling station, that is intended for another station, i.e., called station. For example, the mobile station 202 may attempt to call the remote station 204, or vice versa. When the media gateway 210 receives a call from the calling station, the media gateway queries a seamless mobility register for caller ID information corresponding to the calling station based upon the calling station's telephone number and electronic serial number (ESN) or subscriber identity module (SIM) information. The seamless mobility register is a database that either resides within the media gateway 210 or on a remote server connected to the media gateway. Additionally, the seamless mobility register may exist, in parallel, within a plurality of wireless networks. The seamless mobility register contains data records for each station subscribed to a wireless network. The stored data includes ESN or SIM information, user name, and all telephone numbers associated with each station.

The media gateway 210, upon receiving the subscriber information of the calling station, translates the subscriber information utilized by the calling station's network to the telephone number and user name utilized by the called station's network, and sends this translated information to the called station. The caller ID information of the calling station is subsequently shown on a display of the called station.

FIG. 3 is similar to FIG. 2, but the mobile station 202 is shown to have moved to a transition area 302 of the communication network 206. The media gateway 210 is capable of detecting that the mobile station 202, engaged in a call, has entered the transition area 302 of the area of coverage of the communication network 206. The transition area 302 is defined as an area between the outer boundary 208 and an inner boundary 304 of the area of coverage. The location of the outer boundary 208 is determined based on the communication range of the access point 212 (or communication ranges for a plurality of access points), and the location of the inner boundary 304 is determined based on its relative distance from the outer boundary. If the mobile station 202 enters the transition area 302, the media gateway 210 becomes aware that the mobile station may enter or exit the area of coverage. By monitoring the activity of the mobile station 202 within the transition area 302, particularly relative to the outer and inner boundaries 208, 304, the media gateway 210 is capable of taking this awareness a step further and determining the likelihood that the mobile station will enter or exit the area of coverage. A greater distance between the outer and inner boundaries 208, 304 will provide better accuracy in determining the likelihood of entrance or exit than a lesser distance, but the greater distance will also require more resources to monitor the larger transition area 302 between the boundaries.

In FIG. 3, the communication network 206, more particularly the media gateway 210, detects that the mobile station 202 has reached the outer boundary 208 by measuring the radio signal strength of the mobile station perceived by the access point 212. Upon the radio signal strength reaching a first predetermined minimum threshold value, the media gateway 210 determines whether the mobile station 202 will move back toward the access point 212 such that its signal will improve, or move away from the access point such that communication with the mobile station must be handed-over to the second network 214 in order to maintain the established call. For example, a timer may be set to determine whether the mobile station 202 will return to coverage area such that its signal will improve, or move outside the range of coverage area such that it must handover to the cellular network. Once the communication network 206 detects that the radio signal strength from mobile station 202 has reached a second predetermined minimum threshold value, which is less than the first predetermined minimum threshold value, handover procedures are initiated.

FIG. 3 represents the preferred embodiment in which two different scenarios are possible: (1) the mobile station 202 on a first call is entering the transition area 302 before exiting the communication network 206, and (2) the mobile station on a first call is entering the transition area before entering the communication network. For the first scenario, the media gateway 210 has a first connection line, i.e., the inner mobile line 228, to the mobile station 202 and attempts to establish a third connection line, i.e., the outer mobile line 306, to the mobile station in response to detecting that the mobile station has reached the transition area 302. For the second scenario, the media gateway 210 has a first connection line, i.e., the outer mobile line 306, to the mobile station 202 and attempts to establish of a third connection line, i.e., the inner mobile line 228, to the mobile station in response to detecting that the mobile station has reached the transition area 302. In both scenarios, the media gateway 210 synchronizes the third connection line to the first connection line so that handover can occur from one connection to the other connection in a substantially seamless fashion.

For the preferred embodiment, the media gateway 210 commands the mobile station 202 to place a second call to the media gateway. In response, the mobile station 202 calls a predetermined number to establish the second call and, thus, the third connection line, to the media gateway 210. The predetermined number may be an identification number of the mobile station, such as its telephone number, or a pre-assigned handover number, such as a designated toll-free number (e.g., "800", "888" or "877") or a toll number (e.g., "900"). Since calls between the mobile and remote stations 202, 204 must communicate through the media gateway 210, any communication to the predetermined number must be directed to the media gateway.

The media gateway 210 may establish the third connection line in response to receiving a communication directed to the predetermined number within a predetermined period of time after commanding the mobile station 202 to call the predetermined number. In the alternative, the media gateway 210 may establish the third connection line in response to receiving the communication directed to the predetermined number and determining that the inner mobile line 228 connected between the media gateway and the mobile station 202 is still active. As another alternative, the media gateway 210 may establish the third connection line by calling the mobile station 202 and, via the call, inform the mobile station that a handover operation is to occur. For example, the media gateway 210 may include a header message with the outgoing call that informs the mobile station 202 of the media gateway's intention to handover communication from the inner mobile line 228 to the outer mobile line 306.

Referring to FIG. 4, the mobile station 202 is shown outside of the outer boundary 208 of the communication network 206. The mobile station 202 may reach this position by exiting the communication network 206, or preparing to enter the communication network. If the mobile station 202 has exited the communication network 206, then the media gateway 210 previously had the first connection line, i.e., inner mobile line 228 (shown in FIG. 3), to the mobile station 202, and presently has the third connection line, i.e., outer mobile line 306, to the mobile station. Thus, after the third communication line was established, the media gateway 210 must have handed-over communication from the first connection line to the third connection line and disconnected the first communication line. For the second scenario, then the media gateway 210 presently has the first connection line, i.e., outer mobile line 306, to the mobile station 202, and may attempt to establish of the third connection line, i.e., inner mobile line 228, to the mobile station. Thus, after the third communication line is established, the media gateway 210 will handover communication from the first connection line to the third connection line and disconnect the first communication line. For the preferred embodiment, the first communication line is disconnected, provided that the mobile station 202 remains within the communication network 206 for a predetermined period of time.

For the preferred embodiment shown in FIG. 4, the mobile station 202 is communicating with the media gateway 210 via the outer mobile line 306 and the remote station 204 is communicating with the media gateway via the outer remote line 230. Important to understanding the present invention is that the outer mobile line 306 is established by and under the control of the media gateway 210 even though the stations 202, 204, as illustrated by example in FIG. 4, employ the second network 214. If the stations 202, 204 communicate via the second network 214 without being directed the media gateway 210, the media gateway 210 will not be able to control the communication and, thus, will not be able to handover communication as the mobile station moved in and out of the communication network 206 without communicating communication control signals, such as SS7, with the second network 214. By maintaining the outer mobile line 306 with the media gateway 210, the media gateway is able to alternately handover a given call in a seamless manner as the mobile station 202 moves between the communication and second networks 206, 214 without communicating communication control signals with the second network.

The remote station 204 may or may not subscribe to the communication network 206. If the remote station 204 does not subscribe to the communication network 206 ("non-subscribing remote station") but initiates a call to the mobile station 202, the bearer channel must still be established through the media gateway 210 in order to enable handover of the mobile station. The mobile station 202 subscribes to the communication and second networks 206, 214, so it has a communication network number, such as for example an enterprise number, for operation in the communication network and a second network number, such as for example a cellular number, for operation in the second network. For this particular scenario, if the non-subscribing remote station 204 calls the communication network number, the bearer channel is established through the media gateway 210. Thus, the media gateway 210 will be able to handover communication for the mobile station 202. For another scenario, if the non-subscribing remote station 204 calls the second network number, the call would be connected between the remote station and the mobile station 202 directly through the second network 214. Thus, the media gateway 210 will not have control of the call and will not be able handover communication for the mobile station 202.

For example, in reference to FIG. 4, the remote station 204 is not a subscriber to the communication network 206 but only a subscriber to the second network 214. Although the remote station 204 may be located in or outside the communication network 206, the remote station is located outside of the communication network for this example. The mobile station 202 is a subscriber on both the communication network 206 and the second network 214 and, therefore, has at least two telephone numbers. The mobile station 202 also has data stored in a seamless mobility register database of the media gateway 210. The remote station 204 initiates a call, through the second network 214, to the mobile station 202 using the communication network number of the mobile station to establish the second connection line, i.e., outer remote line 230. The media gateway 210 receives the call and retrieves the subscriber information for the mobile station 202, specifically the second network number of the mobile station. The media gateway 210 then uses call redirect such that the communication network 206 calls the mobile station 202 through the second network 214 to establish the first connection line, i.e., outer mobile line 306. Because the mobile station 202 is located outside of the area of coverage of the communication network 206, the call is received at the mobile station via the second network 214.

For this example, the caller identification display of the mobile station 202 will show the second network telephone number and user name of the remote station 204, because there is no information stored in the media gateway 210 for the remote station 204. In the alternative, the display of the mobile station 202 may shown a particular message, such as "out of area". The outer remote line 230 is maintained by the media gateway 210 throughout the call, because the remote station 204 is not a subscriber to the communication network 206 and information about the remote station is not stored in the seamless mobility register of the media gateway. Also, the remote station 204 of this example cannot handover communication to the communication network 206. The media gateway 210 maintains the bearer channel for the call and the mobile station 202 subscribes to the communication and second networks 206, 214. Therefore, the mobile station 202 may handover communication between the communication and second networks using the procedures disclosed herein.

Figure 5:
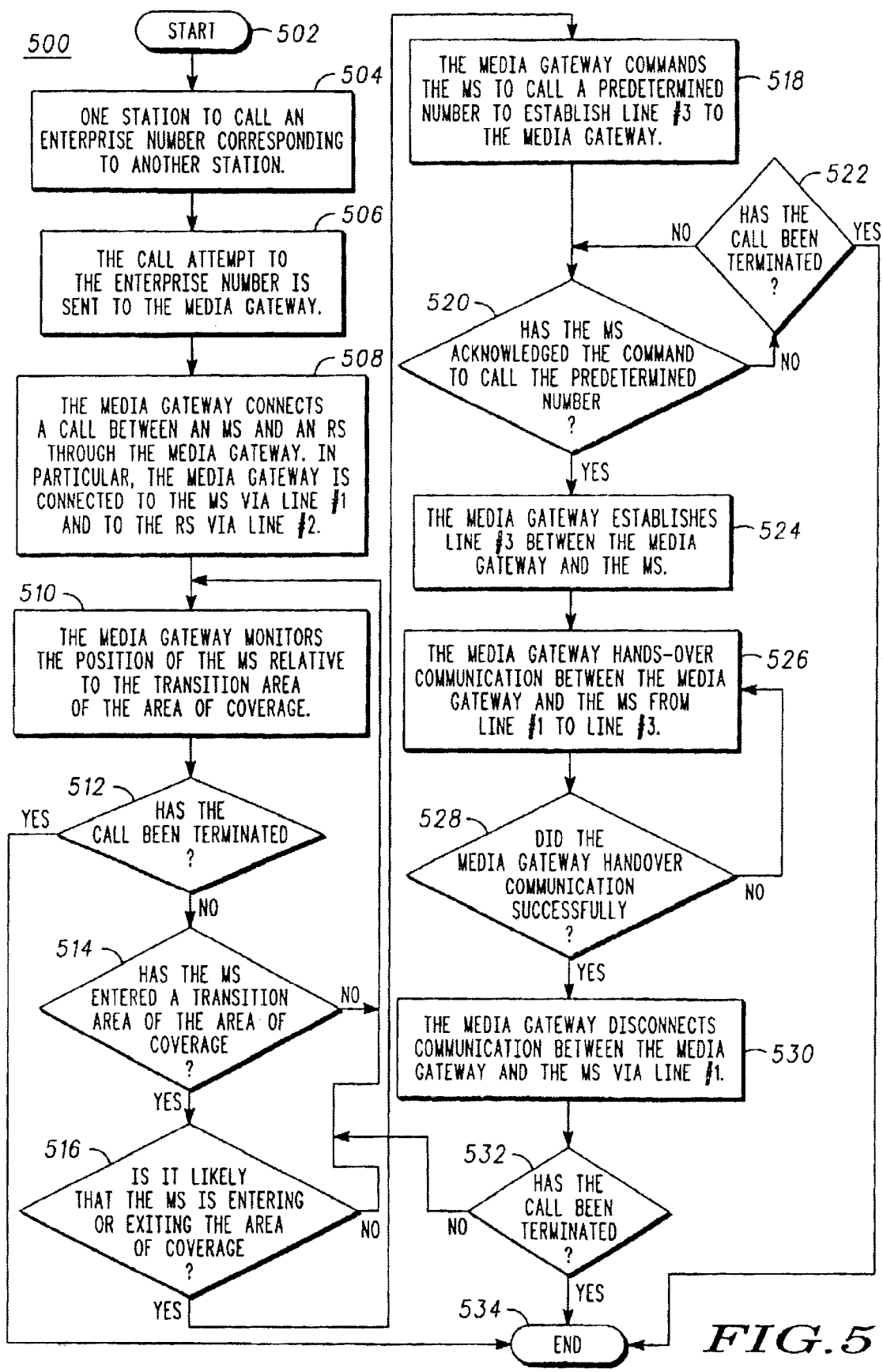
FIG. 5 is a flow diagram illustrating a preferred operation of the media gateway of FIGS. 2 through 4.

Referring to FIG. 5, which is associated with FIGS. 2 through 4, there is provided a flow diagram 500 illustrating a preferred operation of the media gateway 210. After initiating the operation at step 502, one of either the mobile station 202 ("MS") and the remote station 204 ("RS") attempts to call the other of the mobile station and the remote station at step 504. In particular, the mobile station 202 may attempt to call a communication network number of the remote station 204, or the remote station may attempt to call a communication network number of the mobile station. The call attempt to the communication network number, by either the mobile station 202 or the remote station 204, is sent to the media gateway 210 at step 506. As stated above, a bearer channel established between mobile station 202 and the remote station 204 is always established through the media gateway 210. Next, the media gateway 210 connects a call between the mobile station 202 and the remote station 204 through the media gateway at step 508. The media gateway 210 is connected to the mobile station 202 via a first connection line, i.e., Line #1, and the media gateway is connected to the remote station via a second connection line, i.e., Line #2. As shown in FIGS. 2 through 4, the first connection line is represented by one of either the inner mobile line 228 and the outer mobile line 306, and the second connection line is represented by the outer remote line 230.

After a call is connected, the media gateway 210 monitors the position of the mobile station 202 relative to the transition area 302 of the area of coverage at step 510. If the media gateway 210 determines that the call has been terminated at step 512 while it is monitoring the position of the mobile station 202, then the operation terminates at step 534. Otherwise, the media gateway 210 continues to monitor the position of the mobile station 202 at step 510 if the mobile station has not entered a transition area 302 of the area of coverage at step 514 or the mobile station is likely to have entered or exited the area of coverage at step 516. If the call has not been terminated by the time step 512 is reached, the mobile station 202 has entered a transition area of the area of coverage at step 514, and it is likely that the mobile station is entering or exiting the area of coverage at step 516, then the media gateway 210 establishes a third connection line with the mobile station at step 524. As shown in FIGS. 2 through 4, the third connection line is represented by one of either the inner mobile line 228 and the outer mobile line 306, whichever line that does not represent the first connection line. Accordingly, two connection lines exist concurrently between the media gateway 210 and the mobile station 202 during step 524.

The media gateway 210 may establish the third connection line at step 524 in response one or more conditions. For example, the media gateway 210 may command the mobile station 202 to call the media gateway so that the third connection line may be established, or the media gateway may call the mobile station so that the third connection line may be established. If the media gateway 210 commands the mobile station 202 to call a predetermined number directed to the media gateway, then the media gateway may establish the third connection line in response to receiving the call. For example, the third connection line may be established if the call is received by the media gateway 210 within a particular threshold period of time after the media gateway commands the mobile station 202 to call the predetermined number. Also, for example, the third connection line may be established if the predetermined number, from which the media gateway 210 receives the call, is dedicated to the purpose of initiating the third connection line. If the media gateway 210 calls the mobile station 202 to establish the third connection line, then the call may include information to inform the mobile station that the third connection line is being established. For example, when the media gateway 210 calls the mobile station 202, the call may include a call signal indicating that a third connection line should exist concurrently with the first connection line.

For the preferred embodiment, the media gateway 210 may command the mobile station 202 to call a predetermined number to establish the third connection line to the media gateway at step 518 and, then, determine whether the mobile station has acknowledged the command to call the predetermined number at step 520. For example, the mobile station 202 may acknowledge the command by calling the predetermined number. If the mobile station 202 has not acknowledged the command at step 520, the media gateway 210 determines whether the call has been terminated at step 522. The media gateway 210 continues to await either an acknowledgment from the mobile station 202 or an indication that the call has been terminated by looping through steps 520 and 522. If the call has been terminated at step 522, then the operation ends at step 534.

If the mobile station 202 acknowledges the command at step 520, the media gateway 210 establishes a third connection line, i.e., Line #3, between the media gateway and the mobile station at step 524. Then, the media gateway 210 hands-over communication between the media gateway and the mobile station 202 from the first connection line to the third connection line at step 526. As represented by steps 526 and 528, the media gateway 210 continues to attempt handover of communication between the media gateway and the mobile station 202 until handover is successful at step 528. After handover is successful at step 528, the media gateway 210 disconnects communication between the media gateway and the mobile station 202 by disconnecting the first connection line at step 530. If the call has not been terminated by the time step 532 is reached, then the media gateway 210 again monitors the position of the mobile station 202 relative to the transition area 302 of the area of coverage at step 510. Otherwise, if the call has been terminated, the operation ends at step 534.

Figure 6:
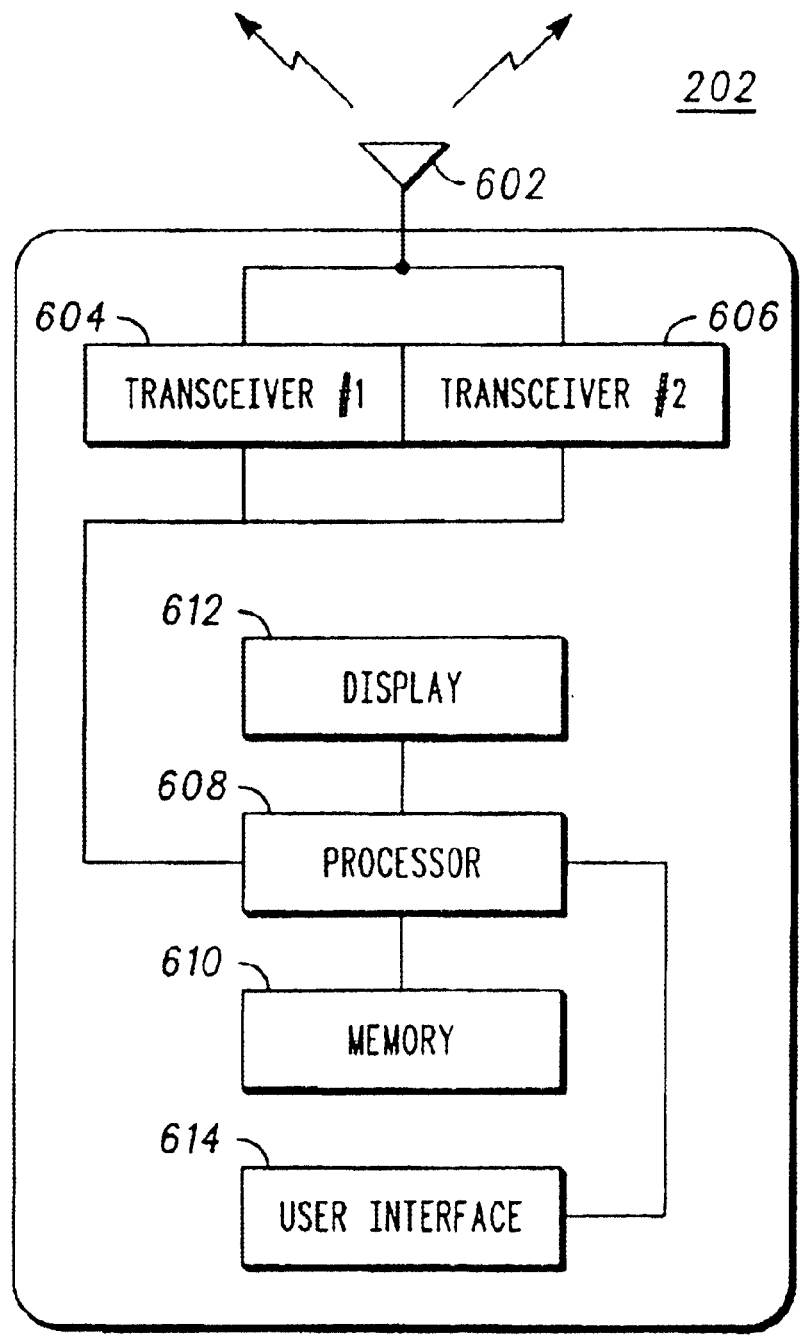
FIG. 6 is a block diagram illustrating inner components of the mobile station of FIGS. 2 through 4.

Referring to FIG. 6, various components of the mobile station 202 are shown. The mobile station 202 generally includes at least one antenna 602, two transceiver circuits 604, 606, and various other components 608–614. The individual components of the mobile station 202 may be integrated together, in part or as a whole. For example, although the transceiver circuits 604, 606 are shown in FIG. 6 as separate circuits, they may be combined to form a single circuit.

As shown in FIG. 6, the mobile station 202 includes a first transceiver circuit 604 ("transceiver #1") and a second transceiver circuit 606 ("transceiver #2"). The first transceiver circuit 604 communicates with a first network within a first area of coverage, and the second transceiver circuit 606 communicates with a second network within a second area of coverage. The second area of coverage is different from the first area of coverage and, preferably, the second network is different from the first network. For the preferred embodiment of the mobile station 202, the first network is one of either a carrier network and a non-carrier network, and the second network is the other of either the carrier network and the non-carrier network. The non-carrier network is a wireless local area network that is not managed by a carrier. For example, the carrier network may be a cellular network and the non-carrier network may be an enterprise network.

The mobile station 202 also includes a main circuit comprising a processor 608 as well as a memory portion 610, a display 612, and a user interface 614 coupled to the processor. The processor provides the general operation of the mobile station 202 based on applications stored in the memory portion 610 and manipulation of data stored in the memory portion. The applications stored in the memory portion 610 includes, but are not limited to, processor code for conducting a call with the remote station 204 through the media gateway 210, processor code for entering the transition area 302 of the communication network 206, processor code for communicating with the media gateway via the first and second transceiver circuits 604, 606 concurrently, processor code for handing-over communication with the media gateway from the first transceiver circuit to the second transceiver circuit, and processor code for disconnecting communication with the media gateway via the first transceiver circuit. Thus, the processor provides operations, as explained below in reference to FIG. 7, that allow for seamless transition between the first and second networks. Also, the display 612 and the user interface 614 provide user interaction to facilitate operation of the mobile device 202 while executing the above processor codes.

The main circuit is coupled to the first and second transceiver circuits 604, 606 and is used for conducting a call with a remote station. For the preferred embodiment, the processor 608 is coupled to the first and second transceiver circuits 604, 606. The main circuit is capable of operating the first and second transceiver circuits 604, 606 concurrently and handing-over communication for the call from the first transceiver circuit 604 to the second transceiver circuit 606. In particular, the main circuit is capable of connecting a first connection line to the remote station 204 via one of either the first transceiver circuit 604 and the second transceiver circuit 606, initiating a second connection line to the remote station via the other of either the first transceiver circuit and the second transceiver circuit, and disconnecting the first connection line. The main circuit initiates operation of the second transceiver circuit 606, while operating the first transceiver circuit 604, in response to receiving a signal indicating that the mobile station 202 entered a transition area or the second area of coverage. The mobile station 202 may enter the transition area by being positioned within a particular range for entering or exiting the non-carrier area of coverage.

Since the mobile station 202 includes two transceiver circuits 604, 606, the mobile station is capable of receiving calls to its communication network number and its second network number. The main circuit is capable of handing-over communication in synchronous with the media gateway 210. For the preferred embodiment, the main circuit is capable of handing-over communication for a call if (a) the remote station 204 initiated the call to the communication network number of the mobile station 202 or a predetermined number directed to the media gateway 210, or (b) the mobile station initiated the call to a communication network number of the remote station or a predetermined number directed to the media gateway. Also, for the preferred embodiment, the main circuit is not capable of handing-over communication for the call if the remote station 204 initiated the call to a second network number of the mobile station 202.

The main circuit may or may not be capable of handing-over communication for the call if the mobile station 202 initiated the call to the second network number of the remote station 204. As stated above, the main circuit of mobile station 202 is capable of handover if mobile station calls a predetermined number that establishes a connection to the media gateway 210, and the media gateway 210 establishes a call to the second network number of the remote station 204. The user may also initiate the call by entering the second network number of the remote station 204 via a user interface of mobile station 202. The mobile station 202 subsequently will establish a call to the media gateway 210, using the predetermined number or communication network number of the remote station 204, transparently with respect to the user. For example, for the preferred embodiment, priority is given to the communication network connection (as opposed to the second network connection) whenever the mobile station 202 is located within the coverage area of the communication network 206. This scenario can occur whether mobile station 202 is located within or outside of the communication network 206. So long as the mobile station 202 establishes a call via the media gateway 210, such that an internal or external communication line is established from mobile station 202 to the media gateway 210, mobile station will be capable of handing over communication between the communication and second networks 206, 214.

FIG. 6 may also represent the remote device 204. The remote station 204 may be similar to the mobile station 202 in all aspects. However, proper operation of the present invention does not require the mobile and remote stations 202, 204 to be identical. In particular, the remote station 204 does not require a second transceiver circuit 606 nor the applications or processor codes stored in the memory portion 610, as described above for the mobile station 202. In fact, existing communication devices may operate as the remote device 204.

Referring to FIG. 7, which is associated with FIG. 6, there is provided a flow diagram 700 illustrating a preferred operation of the mobile station 202. After initiating the operation at step 702, a call is established between the mobile station 202 ("MS") and the remote station 204 ("RS") at step 708. In particular, communication is established between the media gateway 210 and the first transceiver circuit 604 of the mobile station 202. After the call is connected, the mobile station 202 determines whether the call has been terminated at step 712 or the mobile station has entered a transition area 302 of the area of coverage at step 714. If the media gateway 210 determines that the call has been terminated at step 712, then the operation terminates at step 734.

If the call has not been terminated by the time step 712 is reached and the mobile station 202 has entered a transition area of the area of coverage at step 714, then communication is established between the media gateway 210 the second transceiver circuit 606 of the mobile station at step 724. The first and second transceiver circuits communicate concurrently with the media gateway 210 and the mobile station 202 during step 724.

Communication between the media gateway 210 and the second transceiver circuit 606 may be establish at step 724 in response one or more conditions. For example, the media gateway 210 may command the mobile station 202 to call a predetermined number directed to the media gateway, or the media gateway may call the mobile station and inform the mobile station that a connection is being established.

The mobile station 202 then hands-over communication between the media gateway 210 and the mobile station from the first transceiver circuit 604 to the second transceiver circuit 606 at step 726. This handover operation by the mobile station 202 is performed in synchronous with a similar handover operation (step 526 of FIG. 5) performed by the media gateway 210. As represented by steps 726 and 728, the mobile station 202 continues to attempt handover of communication between the media gateway and the mobile station 202 until handover is successful at step 728. After handover is successful at step 728, the media gateway 210 disconnects communication between the media gateway and the first transceiver circuit 604 of the mobile station 202 at step 730. If the call has not been terminated by the time step 712 is reached, then the mobile station 202 again determines whether the mobile station has entered the transition area 302 of the area of coverage at step 714. Otherwise, if the call has been terminated, the operation ends at step 734.

It is to be understood that, in preferred embodiments of the present invention, at least two numbers are assigned to the mobile station 202 for enabling handover between networks. However, more than two numbers may be assigned to the mobile station 202. For example, a universal number may be assigned to the mobile station 202 and stored in the seamless mobility register associated with the media gateway 210. In this case, the herein described use cases would be identical except that the station originating a call would employ the universal number of the called station instead of the communication network number. The media gateway 210 would translate the universal number as required, and per the herein described cases, to establish calls such that the bearer channel is always maintained through the media gateway as described herein.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What we claim is:

1. A method for managing a first communication network having an area of coverage, the first communication network associated with a media gateway that communicates with a plurality of mobile stations, the method comprising the steps of:

connecting a call between a mobile station and a remote station through the media gateway, the media gateway being connected to the mobile station via a first connection line and to the remote station via a second connection line, wherein if the mobile station is outside of the area of coverage and initiates the call, the first connection line is established via a second communication network;

determining that the mobile station entered a transition area of the area of coverage of the first communication network;

receiving a handover call directed to a telephone number by the mobile station to establish a third connection line to the media gateway, wherein if the mobile station is moving into the area of coverage the handover call is received via the first communication network and wherein if the mobile station is moving out of the area of coverage the handover call is received via the second communication network;

establishing the third connection line between the media gateway and the mobile station; and handing-over communication between the media gateway and the mobile station from the first connection line to the third connection line.

2. The method of claim 1, wherein the handover call to the telephone number is directed to the media gateway.

3. The method of claim 1, further comprising the step of commanding the mobile station to call the telephone number to establish the third connection line to the media gateway.

4. The method of claim 3, wherein the step of establishing the third connection line occurs in response to receiving the handover call directed to the telephone number within a predetermined period of time after commanding the mobile station to initiate the handover call.

5. The method of claim 1, wherein the step of establishing the third connection line occurs in response to receiving the handover call directed to the telephone number.

6. The method of claim 1, wherein the step of establishing the third connection line occurs in response to receiving the handover call directed to said telephone number and determining that the first connection line connected between the media gateway and the mobile station is currently active.

7. The method of claim 1, wherein said telephone number is a pre-assigned handover number.

8. The method of claim 1, wherein said handing-over of communication between the media gateway and the mobile station occurs without control coordination signaling for said handing-over between the first communication network and the second communication network.

9. The method of claim 1 wherein, during the step of handing-over communication, the first and third connection lines exist concurrently so that the media gateway may handover communication between the media gateway and the mobile station from the first connection line to the third connection line.

10. The method of claim 1, wherein the first connection line operates within one of either a non-carrier network and a carrier network, and the third connection line operates within the other of either the non-carrier network and the carrier network.

11. The method of claim 1 wherein said mobile station is assigned at least two telephone numbers wherein one number is for communication network and one number is for the second communication network.

12. The method of claim 1, wherein the mobile station communicates with the first communication network using one of IEEE 802.11, Bluetooth, and HomeRF, and the mobile station communicates with the second communication network using one of analog, CDMA, TDMA, GSM, WCDMA, and CDMA2000.

13. A method for managing a first communication network having an area of coverage, the first communication network associated with a media gateway that communicates with a plurality of mobile stations, the method comprising the steps of:

connecting a call between a mobile station and a remote station through the media gateway, the media gateway being connected to the mobile station via a first connection line and to the remote station via a second connection line, wherein if the mobile station is outside of the area of coverage and initiates the call, the first connection line is established via a second communication network;

determining that the mobile station entered a transition area of the area of coverage of the first communication network;

placing a handover call, to the mobile station to establish a third connection line between the media gateway and the mobile station, the handover call including a call header to inform the mobile station that handover from the first connection line to the third connection line will occur, wherein if the mobile station is moving into the area of coverage the handover call is placed via the first communication network and wherein if the mobile station is moving out of the area of coverage the handover call is placed via the second communication network; and handing-ova communication between the media gateway and the mobile station from the first connection line to the third connection line.

14. The method of claim 13, wherein the mobile station communicates with the first communication network using one of IEEE 802.11, Bluetooth, and HomeRF, and the mobile station communicates with the second communication network using one of analog, CDMA, TDMA, GSM, WCDMA, and CDMA2000.

15. A Media Gateway comprising:

at least one transceiver configured to communicate with at least one mobile station wherein said mobile station is assigned at least two telephone numbers wherein one number is for a first wireless network having an area of coverage and associated with the media gateway and one number is for a second wireless network; and at least one processor configured to implement bi-directional handovers of said mobile station between said first wireless network and said second wireless network by the steps comprising:

connecting a call between the mobile station and a remote station through the media gateway, the media gateway being connected to the mobile station via a first connection line and to the remote station via a second connection line, wherein if the mobile station is outside of the area of coverage and initiates the call, the first connection line is established via the second wireless network;

determining that said mobile station has moved to a boundary of the area of coverage of the first wireless network;

determining which one of said first wireless network and said second wireless network is a target network for handover;

placing a handover phone call to said mobile station using one of said at least two telephone numbers associated with said target network;

determining that said mobile station has been, one of inside and outside, of the boundary of the area of coverage of the first wireless network for a predetermined period of time; and disconnecting the first connection line, and maintaining bearer traffic through said media gateway via the second connection line and a new connection line established in response to the handover phone call.

16. A Media Gateway comprising:

at least one transceiver configured to communicate with at least one mobile station wherein said mobile station is assigned at least two telephone numbers wherein one number is for a first wireless network having an area of coverage and associated with the media gateway and one number is for a second wireless network; and at least one processor configured to implement bi-directional handovers of said mobile station between said first wireless network and said second wireless network by the steps comprising:

connecting a call between the mobile station and a remote station through the media gateway, the media gateway being connected to the mobile station via a first connection line and to the remote station via a second connection line, wherein if the mobile station is outside of the are of coverage and initiates the call, the first connection line is established via the second wireless network;

determining that said mobile station has moved to a boundary of the area of coverage of said first wireless network;

determining which one of said first wireless network and said second wireless network is a target network for handover;

commanding said mobile station to place a handover call using one of said at least two telephone numbers associated with said target network;

receiving said handover call from said mobile station using one of said at least two telephone numbers associated with said target network;

determining that said mobile station has been, one of inside and outside, of the boundary of the area of coverage of said first wireless network for a predetermined period of time; and disconnecting the first connection line, and maintaining bearer traffic through said media gateway via the second connection line and a new connection line established in response to the handover call.

* * * * *

UNITED STATES PATENT AND TRADEMARK OFFICE
CERTIFICATE OF CORRECTION

PATENT NO. : 6,889,045 B2
DATED : May 3, 2005
INVENTOR(S) : Pan, Shaowei et al.

It is certified that error appears in the above-identified patent and that said Letters Patent is hereby corrected as shown below:

<u>Column 16,</u>
Line 23, insert -- the first -- before "communication network"
Line 59, delete "handing-ova" and replace with -- handing-over --

Signed and Sealed this

Second Day of August, 2005

JON W. DUDAS
*Director of the United States Patent and Trademark Office*